(12) United States Patent
Kim et al.

(10) Patent No.: US 9,497,757 B2
(45) Date of Patent: Nov. 15, 2016

(54) METHOD AND APPARATUS FOR TRANSMITTING CONTROL INFORMATION FOR REDUCTION OF INTER-CELL INTERFERENCE IN WIRELESS COMMUNICATION SYSTEM

(75) Inventors: Ki Tae Kim, Anyang-si (KR); Jin Young Chun, Anyang-si (KR);
(Continued)

(73) Assignee: LG ELECTRONICS INC., Seoul (KR)

( * ) Notice: Subject to any disclaimer, the term of this patent is extended or adjusted under 35 U.S.C. 154(b) by 610 days.

(21) Appl. No.: 13/883,272

(22) PCT Filed: Nov. 2, 2011

(86) PCT No.: PCT/KR2011/008266
§ 371 (c)(1),
(2), (4) Date: May 2, 2013

(87) PCT Pub. No.: WO2012/060618
PCT Pub. Date: May 10, 2012

(65) Prior Publication Data
US 2013/0229985 A1    Sep. 5, 2013

Related U.S. Application Data

(60) Provisional application No. 61/409,540, filed on Nov. 3, 2010.

(30) Foreign Application Priority Data

Oct. 19, 2011  (KR) .................. 10-2011-0106901

(51) Int. Cl.
*H04W 72/04* (2009.01)
*H04B 7/02* (2006.01)
*H04L 25/03* (2006.01)

(52) U.S. Cl.
CPC ......... *H04W 72/0426* (2013.01); *H04B 7/024* (2013.01); *H04L 25/03343* (2013.01)

(58) Field of Classification Search
CPC combination set(s) only.
See application file for complete search history.

(56) References Cited

U.S. PATENT DOCUMENTS

| 8,554,241 B2 * | 10/2013 | Lim ................ H04B 7/0417 370/203 |
| 2009/0015478 A1 * | 1/2009 | Li .................... H04B 7/086 342/377 |

(Continued)

OTHER PUBLICATIONS

Alcatel-Lucent Shanghai Bell, et al., "Discussion of CQI/PMI reporting enhancement on PUSCH for SU/MU-MIMO scheduling," R1-105203, 3GPP TSG RAN WG1 Meeting #62bis, Oct. 2010, 10 pages.

(Continued)

*Primary Examiner* — Mounir Moutaouakil
(74) *Attorney, Agent, or Firm* — Lee Hong Degerman Kang & Waimey

(57) ABSTRACT

A method and apparatus of transmitting control information for reduction of inter-cell interference (ICI) in a wireless communication system is provided. The base station transmits one of precoding information and antenna information for every time frequency resource to a second base station based on a ICI reduction method determined by the base station.

15 Claims, 14 Drawing Sheets

(75) Inventors: Su Nam Kim, Anyang-si (KR); Ji Won Kang, Anyang-si (KR); Bin Chul Ihm, Anyang-si (KR); Sung Ho Park, Anyang-si (KR)

(56) References Cited

U.S. PATENT DOCUMENTS

| | | | | |
|---|---|---|---|---|
| 2009/0196162 A1* | 8/2009 | Sambhwani | ......... | H04B 1/7103 370/201 |
| 2010/0220670 A1* | 9/2010 | Teo | ......... | H04J 11/005 370/329 |
| 2011/0034192 A1* | 2/2011 | Lim | ......... | H04B 7/0417 455/501 |
| 2013/0229971 A1* | 9/2013 | Siomina | ......... | H04W 24/10 370/312 |
| 2013/0229985 A1* | 9/2013 | Kim | ......... | H04W 72/0426 370/328 |

OTHER PUBLICATIONS

LG Electronics, "Methods to facilitate the inter-cell coordination in heterogeneous networks," R1-105358, 3GPP TSG RAN WG1 Meeting #62bis, Oct. 2010, 3 pages.
LG Electronics, "Details of eICIC in Macro-Pico case," R1-105352, 3GPP TSG RAN WG1 Meeting #62bis, Oct. 2010, 4 pages.
New Postcom, "Further considerations on Macro-Femto eICIC," R1-105224, 3GPP TSG RAN WG1 Meeting #62bis, Oct. 2010, 3 pages.

* cited by examiner

FIG. 11

| SF #0, PMI #1~#16 | SF #1, PMI #1~#5 | SF #2, PMI #1~#16 | SF #3, PMI #1~#16 | SF #4, PMI #1~#16 | SF #5, PMI #1~#16 | SF #6, PMI #1~#5 | SF #7, PMI #1~#16 | SF #8, PMI #1~#16 | SF #9, PMI #1~#16 |

FIG. 12

| SF #0, Antenna #1~#4 | SF #1, Antenna #2~#4 | SF #2, Antenna #1~#4 | SF #3, Antenna #1~#4 | SF #4, Antenna #1~#4 | SF #5, Antenna #1~#4 | SF #6, Antenna #2~#4 | SF #7, Antenna #1~#4 | SF #8, Antenna #1~#4 | SF #9, Antenna #1~#4 |
|---|---|---|---|---|---|---|---|---|---|

METHOD AND APPARATUS FOR TRANSMITTING CONTROL INFORMATION FOR REDUCTION OF INTER-CELL INTERFERENCE IN WIRELESS COMMUNICATION SYSTEM

CROSS-REFERENCE TO RELATED APPLICATIONS

This application is the National Stage filing under 35 U.S.C. 371 of International Application No. PCT/KR2011/008266, filed on Nov. 2, 2011, which claims the benefit of earlier filing date and right of priority to Korean Patent Application No. 10-2011-0106901, filed on Oct. 19, 2011, and also claims the benefit of U.S. Provisional Application Ser. No. 61/409,540, filed on Nov. 3, 2010, the contents of which are hereby incorporated by reference herein in their entirety.

TECHNICAL FIELD

The present invention relates to wireless communication and, more particularly, to a method and apparatus for transmitting control information for a reduction of inter-cell interference in a wireless communication system.

BACKGROUND ART

The next-generation multimedia wireless communication systems which are recently being actively researched are required to process and transmit various pieces of information, such as video and wireless data as well as the initial voice-centered services. The $4^{th}$ generation wireless communication systems which are now being developed subsequently to the $3^{rd}$ generation wireless communication systems are aiming at supporting high-speed data service of downlink 1 Gbps (Gigabits per second) and uplink 500 Mbps (Megabits per second). The object of the wireless communication system is to establish reliable communications between a number of users irrespective of their positions and mobility. However, a wireless channel has abnormal characteristics, such as path loss, noise, a fading phenomenon due to multi-path, inter-symbol interference (ISI), and the Doppler Effect resulting from the mobility of a user equipment. A variety of techniques are being developed in order to overcome the abnormal characteristics of the wireless channel and to increase the reliability of wireless communication.

A current wireless communication environment is pursuing the diversity of communication methods and devices in order to satisfy different service requirements. In the next-generation mobile communication system, it is basically expected that a demand for data traffic will be rapidly increased, and thus a communication method of preventing a large amount of data traffic from being concentrated on one node is being developed. For example, there has been research carried out on a communication method of distributing traffic into a plurality of base stations or a plurality of nodes. From among them, a communication method using a heterogeneous network is one of the major subjects of research. The heterogeneous network basically refers to a communication environment where base stations each having relatively small service coverage coexist within the service coverage of the existing base station.

In the heterogeneous network communication environment, inter-cell interference (ICI) may occur between the base stations. In general, the ICI may affect femto user equipment or pico user equipment which is served by a femto cell or a pico cell, having small service coverage, from a macro cell. In order to solve the ICI problem, a time domain-based solution and a frequency domain-based solution were proposed. For the time domain-based solution, reference may be made to 3GPP -RAN WG1 #62bis R1-105750. The ICI, however, cannot be efficiently removed by only the time domain-based solution or the frequency domain-based solution.

There is a need for a method of efficiently solving the ICI problem between base stations in a heterogeneous network communication environment.

SUMMARY OF INVENTION

Technical Problem

The present invention provides a method and apparatus for transmitting control information for a reduction of ICI in a wireless communication system.

Solution to Problem

In an aspect, a method of transmitting control information by a first base station in a wireless communication system is provided. The method includes transmitting one of precoding information and antenna information for each time frequency resource to a second base station based on a inter-cell interference (ICI) reduction method determined by the first base station.

The precoding information may indicate precoding matrix indicators (PMIs) used by the first base station for every subframe or PMIs usable by the second base station for every subframe.

The precoding information may consist of a bitmap based on a total number of the PMIs.

The precoding information may include an index of at least one PMI and a number of PMIs based on the at least one PMI.

The precoding information may include an index of at least one PMI and a threshold based on the at least one PMI.

The antenna information may indicate antennas used by the first base station for every subframe or antennas usable by the second base station for every subframe.

The method may further include receiving antenna interference information measured by user equipments, served by the second base station, from the second base station if the antenna information indicates the antennas used by the first base station for every subframe, wherein the antenna information is based on the received antenna interference information.

The method may further include receiving antenna interference information measured by user equipments, served by the first base station, or directly obtaining antenna interference information if the antenna information indicates the antennas usable by the second base station for every subframe, wherein the antenna information is based on the received or obtained antenna interference information.

The antenna information may consist of a bitmap based on a total number of the antennas.

The method may further include the second base station allocating downlink resources to a user equipment based on the received precoding information or the received antenna information.

The method may further include the second base station communicating with the user equipment through the downlink resources allocated to the UE.

The first base station may be a base station providing service to a macro cell, and the second base station may be a base station providing service to a femto cell or a pico cell having service coverage included in service coverage of the macro cell.

In another aspect, a first base station in a wireless communication system is provided. The first base station includes a radio frequency (RF) unit configured for transmitting or receiving a radio signal, and a processor, coupled to the RF unit, and configured for transmitting one of precoding information and antenna information for each time frequency resource to a second base station based on a inter-cell interference (ICI) reduction method determined by the first base station.

Advantageous Effects of Invention

ICI can be efficiently reduced in a heterogeneous network communication environment.

BRIEF DESCRIPTION OF DRAWINGS

FIG. 11 shows an embodiment of PMI use information according to a proposed method of transmitting control information for a reduction in ICI.
FIG. 12 shows an embodiment of antenna use information according to a proposed method of transmitting control information for a reduction in ICI.

MODE FOR THE INVENTION

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as IEEE (Institute of Electrical and Electronics Engineers) 802.11 (Wi-Fi), IEEE 802.16 (WiMAX), IEEE 802.20, E-UTRA (Evolved UTRA), and the like. IEEE 802.16m, an evolution of IEEE 802.16e, provides backward compatibility with a system based on IEEE 802.16e. The UTRA is part of a universal mobile telecommunications system (UMTS). 3GPP ($3^{rd}$ generation partnership project) LTE (long term evolution) is part of an evolved UMTS (E-UMTS) using the E-UTRA, which employs the OFDMA in downlink and the SC-FDMA in uplink. LTE-A (advanced) is an evolution of 3GPP LTE.

Hereinafter, for clarification, LET-A will be largely described, but the technical concept of the present invention is not meant to be limited thereto.

Figure 1:
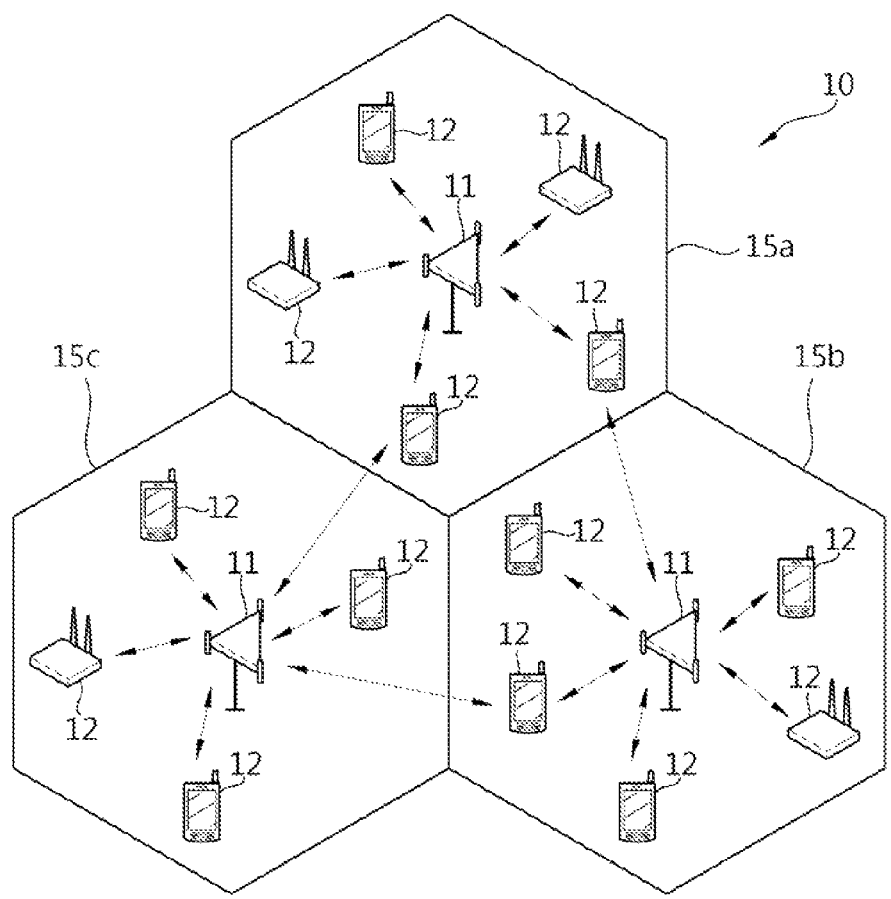
FIG. 1 shows a wireless communication system.

FIG. 1 shows a wireless communication system.

The wireless communication system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as MS (mobile station), MT (mobile terminal), UT (user terminal), SS (subscriber station), wireless device, PDA (personal digital assistant), wireless modem, handheld device. The BS 11 generally refers to a fixed station that communicates with the UE 12 and may be called by other names such as eNB (evolved-NodeB), BTS (base transceiver system), access point (AP), etc.

In general, a UE belongs to one cell, and the cell to which a UE belongs is called a serving cell. A BS providing a communication service to the serving cell is called a serving BS. The wireless communication system is a cellular system, so a different cell adjacent to the serving cell exists. The different cell adjacent to the serving cell is called a neighbor cell. A BS providing a communication service to the neighbor cell is called a neighbor BS. The serving cell and the neighbor cell are relatively determined based on a UE.

This technique can be used for downlink or uplink. In general, downlink refers to communication from the BS 11 to the UE 12, and uplink refers to communication from the UE 12 to the BS 11. In downlink, a transmitter may be part of the BS 11 and a receiver may be part of the UE 12. In uplink, a transmitter may be part of the UE 12 and a receiver may be part of the BS 11.

The wireless communication system may be any one of a MIMO (Multiple-Input Multiple-Output) system, a MISO (Multiple-Input Single-Output) system, an SISO (Single-Input Single-Output) system, and an SIMO (Single-Input Multiple-Output) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
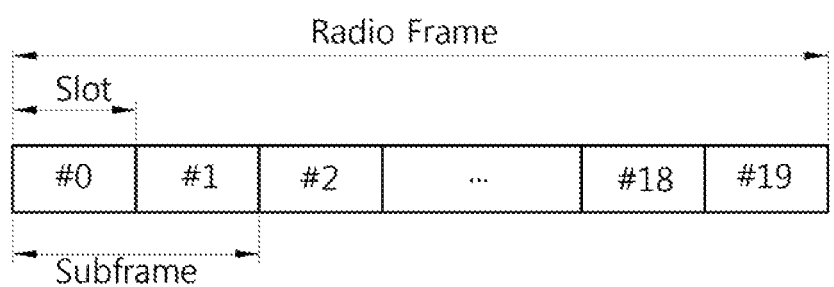
FIG. 2 shows the structure of a radio frame in 3GPP LTE.

FIG. 2 shows the structure of a radio frame in 3GPP LTE.

It may be referred to Paragraph 5 of "Technical Specification Group Radio Access Network; Evolved Universal Terrestrial Radio Access (E-UTRA); Physical channels and modulation (Release 8)" to 3GPP (3rd generation partnership project) TS 36.211 V8.2.0 (2008-03). Referring to FIG. 2, the radio frame includes 10 subframes, and one subframe includes two slots. The slots in the radio frame are numbered by #0 to #19. A time taken for transmitting one subframe is called a transmission time interval (TTI). The TTI may be a scheduling unit for a data transmission. For example, a radio frame may have a length of 10 ms, a subframe may have a length of 1 ms, and a slot may have a length of 0.5 ms.

One slot includes a plurality of OFDM (Orthogonal Frequency Division Multiplexing) symbols in a time domain and a plurality of subcarriers in a frequency domain. Since 3GPP LTE uses OFDMA in downlink, the OFDM symbols are used to express a symbol period. The OFDM symbols may be called by other names depending on a multiple-access scheme. For example, when SC-FDMA is in use as an uplink multi-access scheme, the OFDM symbols may be called SC-FDMA symbols. A resource block (RB), a resource allocation unit, includes a plurality of continuous sub-carriers in a slot. The structure of the radio frame is merely an example. Namely, the number of subframes included in a radio frame, the number of slots included in a subframe, or the number of OFDM symbols included in a slot may vary.

3GPP LTE defines that one slot includes seven OFDM symbols in a normal cyclic prefix (CP) and one slot includes six OFDM symbols in an extended CP.

The wireless communication system may be divided into a frequency division duplex (FDD) scheme and a time division duplex (TDD) scheme. According to the FDD scheme, an uplink transmission and a downlink transmission are made at different frequency bands. According to the TDD scheme, an uplink transmission and a downlink transmission are made during different periods of time at the same frequency band. A channel response of the TDD scheme is substantially reciprocal. This means that a downlink channel response and an uplink channel response are almost the same in a given frequency band. Thus, the TDD-based wireless communication system is advantageous in that the downlink channel response can be obtained from the uplink channel response. In the TDD scheme, the entire frequency band is time-divided for uplink and downlink transmissions, so a downlink transmission by the BS and an uplink transmission by the UE can be simultaneously performed. In a TDD system in which an uplink transmission and a downlink transmission are discriminated in units of subframes, the uplink transmission and the downlink transmission are performed in different subframes.

Figure 3:
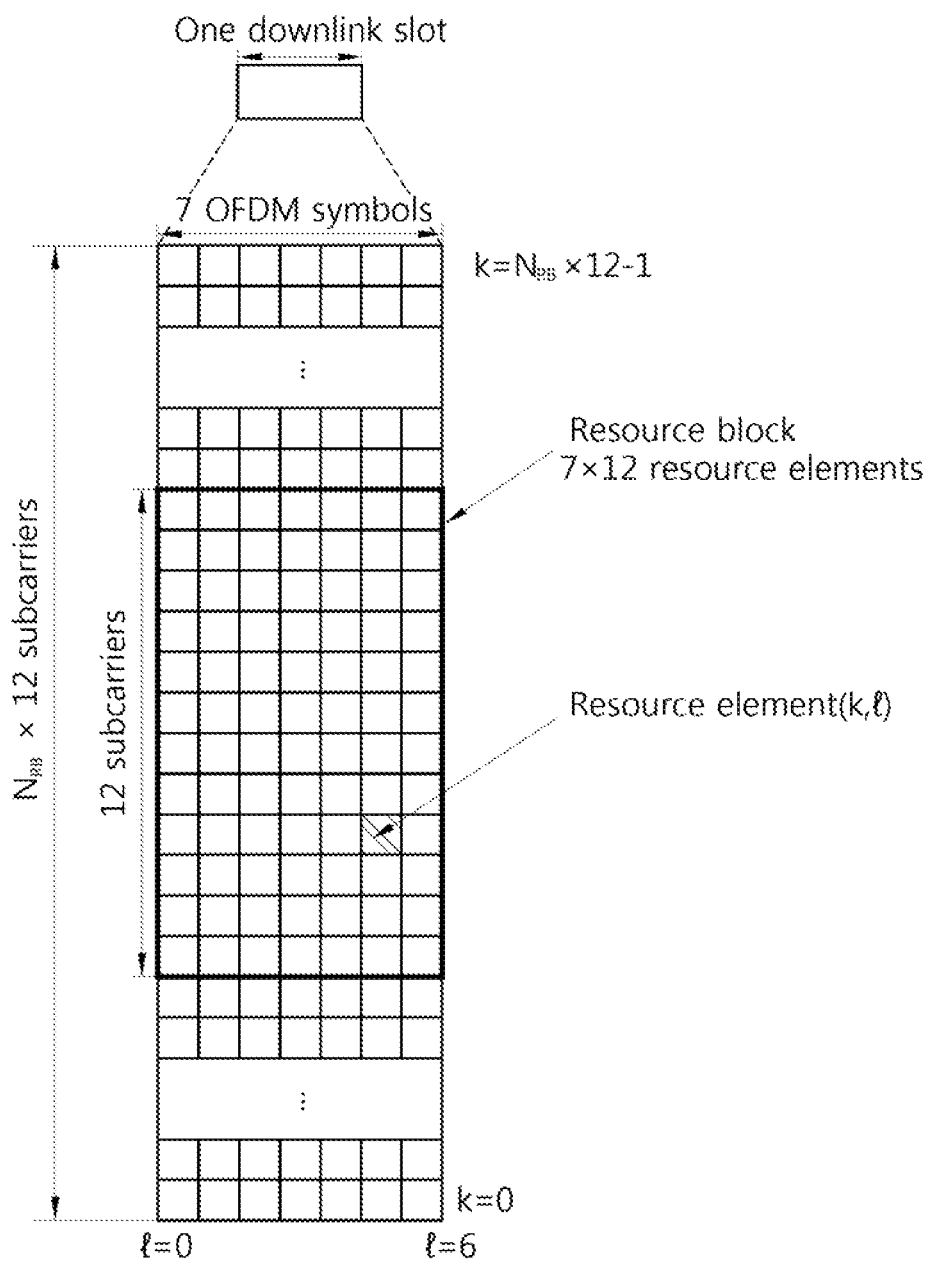
FIG. 3 shows an example of a resource grid of a single downlink slot.

FIG. 3 shows an example of a resource grid of a single downlink slot.

A downlink slot includes a plurality of OFDM symbols in the time domain and $N_{RB}$ number of resource blocks (RBs) in the frequency domain. The $N_{RB}$ number of resource blocks included in the downlink slot is dependent upon a downlink transmission bandwidth set in a cell. For example, in an LTE system, $N_{RB}$ may be any one of 60 to 110. One resource block includes a plurality of subcarriers in the frequency domain. An uplink slot may have the same structure as that of the downlink slot.

Each element on the resource grid is called a resource element. The resource elements on the resource grid can be discriminated by a pair of indexes (k,l) in the slot. Here, k (k=0, . . . ,$N_{RB}$×12−1) is a subcarrier index in the frequency domain, and 1 is an OFDM symbol index in the time domain.

Here, it is illustrated that one resource block includes 7×12 resource elements made up of seven OFDM symbols in the time domain and twelve subcarriers in the frequency domain, but the number of OFDM symbols and the number of subcarriers in the resource block are not limited thereto. The number of OFDM symbols and the number of subcarriers may vary depending on the length of a cyclic prefix (CP), frequency spacing, and the like. For example, in case of a normal CP, the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
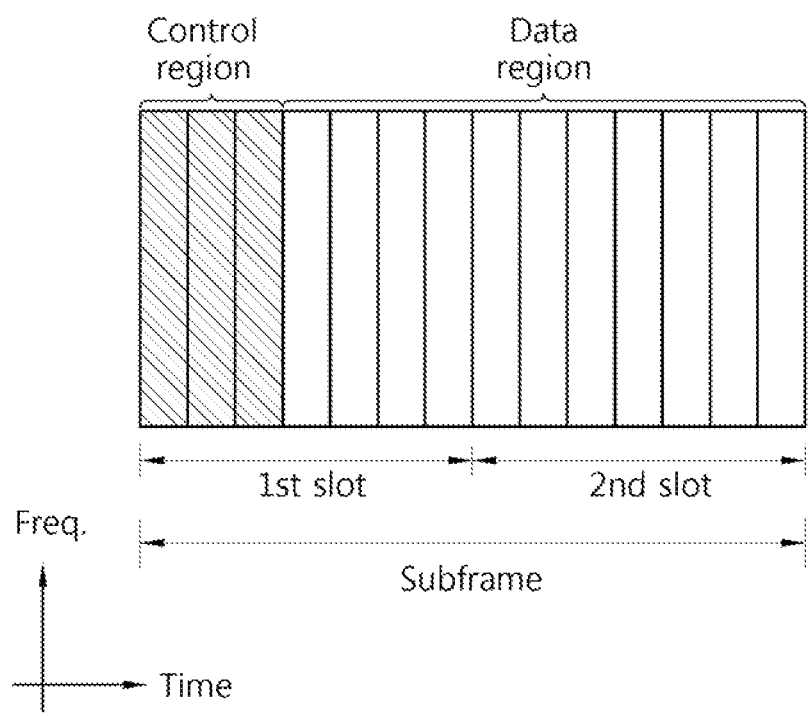
FIG. 4 shows the structure of a downlink subframe.

FIG. 4 shows the structure of a downlink subframe.

A downlink subframe includes two slots in the time domain, and each of the slots includes seven OFDM symbols in the normal CP. First three OFDM symbols (maximum four OFDM symbols with respect to a 1.4 MHz bandwidth) of a first slot in the subframe corresponds to a control region to which control channels are allocated, and the other remaining OFDM symbols correspond to a data region to which a physical downlink shared channel (PDSCH) is allocated.

The PDCCH may carry a transmission format and a resource allocation of a downlink shared channel (DL-SCH), resource allocation information of an uplink shared channel (UL-SCH), paging information on a PCH, system information on a DL-SCH, a resource allocation of an higher layer control message such as a random access response transmitted via a PDSCH, a set of transmission power control commands with respect to individual UEs in a certain UE group, an activation of a voice over internet protocol (VoIP), and the like. A plurality of PDCCHs may be transmitted in the control region, and a UE can monitor a plurality of PDCCHs. The PDCCHs are transmitted on one or an aggregation of a plurality of consecutive control channel elements (CCE). The CCE is a logical allocation unit used to provide a coding rate according to the state of a wireless channel. The CCD corresponds to a plurality of resource element groups. The format of the PDCCH and an available number of bits of the PDCCH are determined according to an associative relation between the number of the CCEs and a coding rate provided by the CCEs.

The BS determines a PDCCH format according to a DCI to be transmitted to the UE, and attaches a cyclic redundancy check (CRC) to the DCI. A unique radio network temporary identifier (RNTI) is masked on the CRC according to the owner or the purpose of the PDCCH. In case of a PDCCH for a particular UE, a unique identifier, e.g., a cell-RNTI (C-RNTI), of the UE, may be masked on the CRC. Or, in case of a PDCCH for a paging message, a paging indication identifier, e.g., a paging-RNTI (P-RNTI), may be masked on the CRC. In case of a PDCCH for a system information block (SIB), a system information identifier, e.g., a system information-RNTI (SI-RNTI), may be masked on the CRC. In order to indicate a random access response, i.e., a response to a transmission of a random access preamble of the UE, a random access-RNTI (RA-RNTI) may be masked on the CRC.

Figure 5:
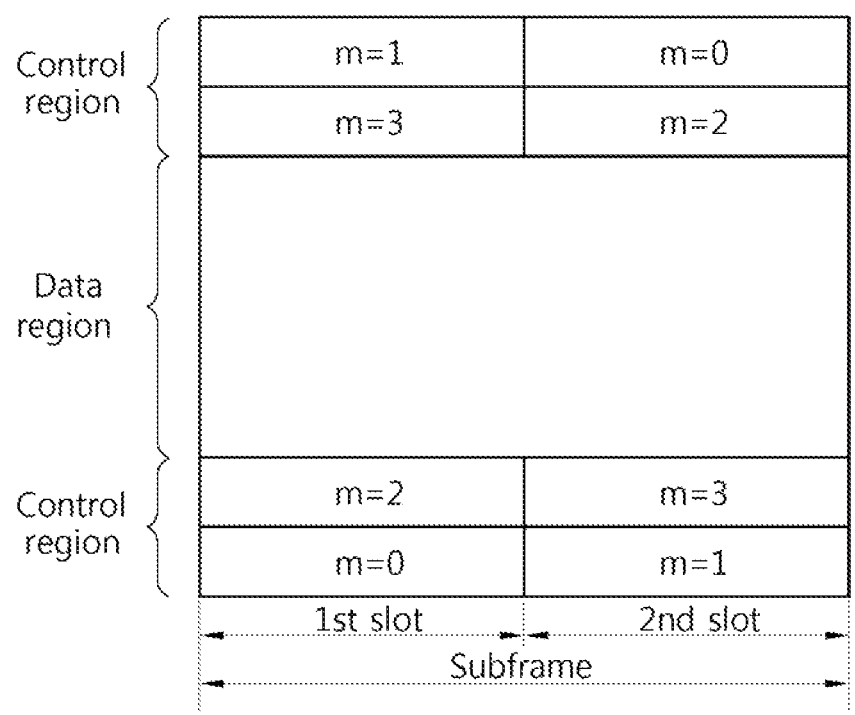
FIG. 5 shows the structure of an uplink subframe.

FIG. 5 shows the structure of an uplink subframe.

An uplink subframe may be divided into a control region and a data region in the frequency domain. A physical uplink control channel (PUCCH) for transmitting uplink control information is allocated to the control region. A physical uplink shared channel (PUCCH) for transmitting data is allocated to the data region. When indicated by a higher layer, the UE may support a simultaneous transmission of the PUSCH and the PUCCH.

The PUCCH with respect to a UE is allocated by a pair of resource blocks in a subframe. The resource blocks belonging to the pair of resource blocks (RBs) occupy different subcarriers in first and second slots, respectively. The frequency occupied by the RBs belonging to the pair of RBs is changed based on a slot boundary. This is said that the pair of RBs allocated to the PUCCH is frequency-hopped at the slot boundary. The UE can obtain a frequency diversity gain by transmitting uplink control information through different subcarriers according to time. In FIG. 5, m is a position index indicating the logical frequency domain positions of the pair of RBs allocated to the PUCCH in the subframe.

Uplink control information transmitted on the PUCCH may include a hybrid automatic repeat request (HARQ) acknowledgement/non-acknowledgement (ACK/NACK), a channel quality indicator (CQI) indicating the state of a downlink channel, a scheduling request (SR), and the like.

The PUSCH is mapped to an uplink shared channel (UL-SCH), a transport channel.

Uplink data transmitted on the PUSCH may be a transport block, a data block for the UL-SCH transmitted during the TTI. The transport block may be user information. Or, the uplink data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the uplink data may include only control information.

Hereafter, a method for reducing an inter-cell interference (ICI) in a heterogeneous network communication environment is described.

Figure 6:
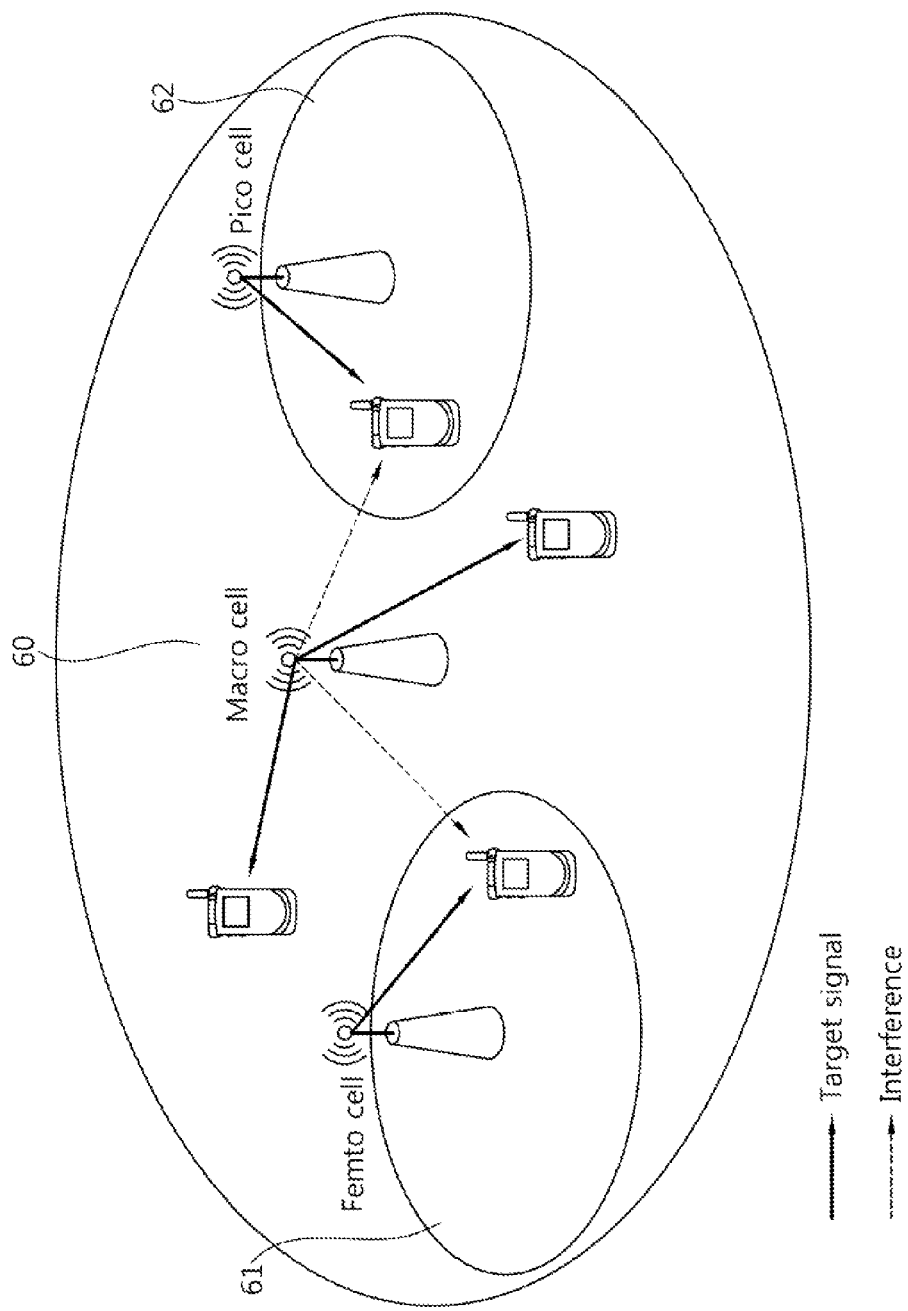
FIG. 6 shows an example of a heterogeneous network communication environment.

FIG. 6 shows an example of a heterogeneous network communication environment.

The heterogeneous network basically refers to a communication environment where base stations each having relatively small service coverage coexist within the service coverage of the existing base station. Multiple cells may exist in a single cellular coverage. A cell having a small service coverage relatively may be one of a femto cell, a pico cell, a hotspot or a relay station.

Referring to FIG. 6, a heterogeneous network communication environment includes at least one macro cell 60, and at least one femto cell 61 and/or at least one pico cell 62. The service coverage of the macro cell 60 is larger than the service coverage of the femto cell 61 or a service coverage of the pico cell 62. The service coverage of the femto cell 61 and the service coverage of the pico cell 62 may be included in the service coverage of the macro cell 60. The macro cell 60 transmits a target signal to a macro UE served by the macro cell 60, the femto cell 61 transmits a target signal to a femto UE served by the femto cell 61, and the pico cell 62 transmits a target signal to a pico UE served by the pico cell 62. Meanwhile, in general, the transmission power of the macro cell 60 is stronger than the transmission power of the femto cell 61 or the pico cell 62. Accordingly, the macro cell 60 may act on the femto UE, served by the femto cell 61, or the pico UE, served by the pico cell 62, as interference. In particular, the macro cell 60 may greatly act on a UE, placed at the boundary of the femto cell 61 or the pico cell 62, as interference.

In order to solve the ICI problem between a macro cell and a femto cell or a pico cell, a frequency domain-based solution and a time domain-based solution may be proposed. In the time domain-based solution, radio resources used by the macro cell and radio resources used by the femto cell or the pico cell may be separated from each other in the time domain. In the frequency domain-based solution, radio resources used by the macro cell and radio resources used by the femto cell or the pico cell may be separated from each other in the frequency domain. A cell having small service coverage is commonly called a pico cell, but not limited thereto.

Figure 7:
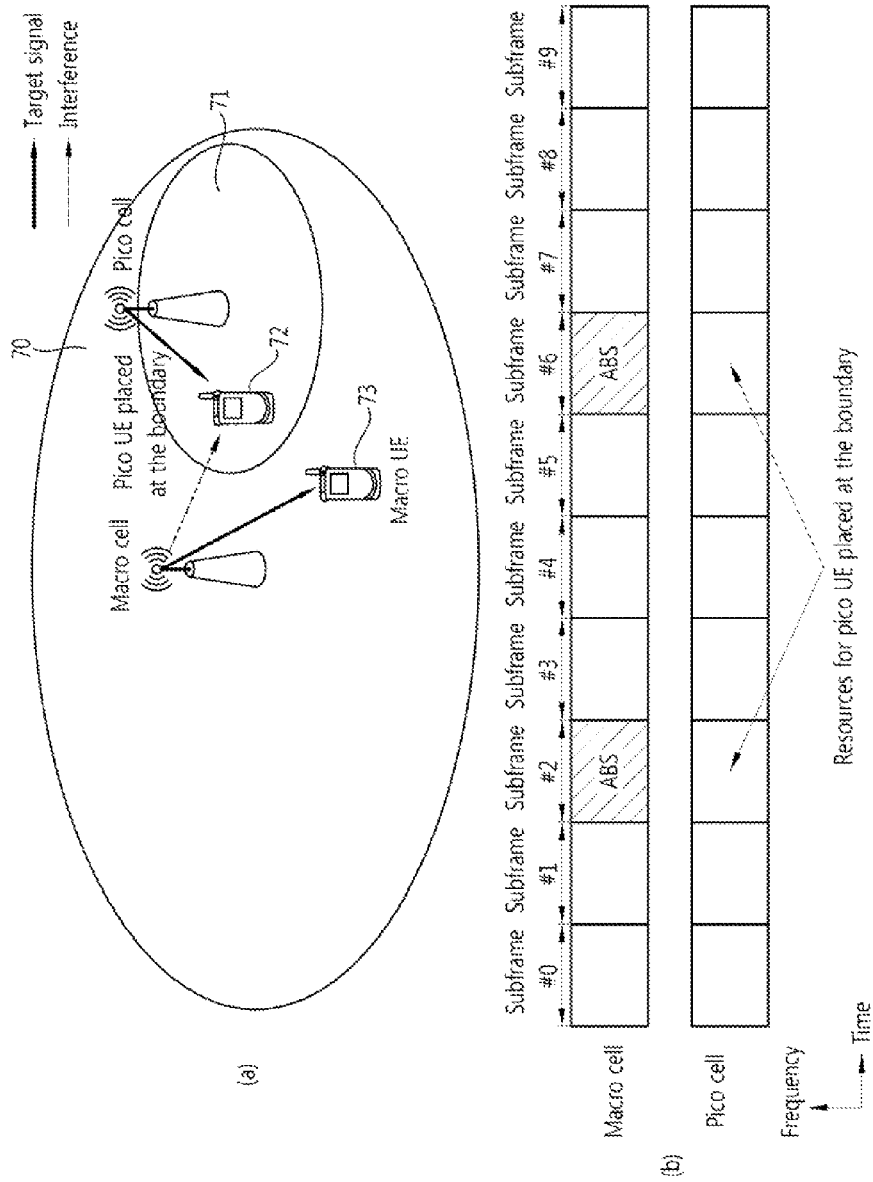
FIG. 7 shows an embodiment of a time domain-based solution for reducing ICI in a heterogeneous network communication environment.

FIG. 7 shows an embodiment of a time domain-based solution for reducing ICI in a heterogeneous network communication environment.

FIG. 7(a) shows an example where a macro cell acts on a pico UE, placed at the boundary of a pico cell, as interference in a heterogeneous network communication environment. The heterogeneous network communication environment includes a macro cell 70 and a pico cell 71. The macro cell 70 transmits a target signal to a macro UE 73, and the pico cell 71 transmits a target signal to a pico UE 72. Since the intensity of transmission power of the macro cell 70 is stronger than the intensity of transmission power of the pico cell 71, the macro cell 70 acts on the pico UE 72, placed at the boundary of service coverage of the pico cell 71, as interference.

FIG. 7(b) shows an example of the configuration of a DL subframe according to the time domain-based solution. Referring to FIG. 7(b), the subframe #2 and the subframe #6 of a macro cell are set as almost blank subframes (ABSs). The macro cell may configure an ABS according to circumstances and may not transmit data in a subframe set as an ABS, but may transmit only minimum control information only in the subframe set as the ABS. The macro cell may transmit information about the set ABS to a pico cell through an X2 interface. Here, the information about the ABS may be a bitmap of 40 bits. The pico cell may determine a pico UE placed at the boundary of the pico cell and may schedule the pico UE only in a subframe set as an ABS in order to avoid ICI.

A control signal or a control channel that can be transmitted in the subframe set as the ABS may be a cell-specific reference signal (CRS), a primary synchronization signal (PSS), a second synchronization signal (SSS), a physical broadcast channel (PBCH), a system information block 1 (SIB 1), paging, or a positioning reference signal (PRS). Other signals are not transmitted in the subframe set as the ABS. Furthermore, if a multicast broadcast single frequency network (MBSFN) subframe in which data is not transmitted is set as the ABS, the MBSFN subframe may become an a complete empty region where even the CRS is not defined. Furthermore, an MBSFN subframe in which data is transmitted cannot be set as the ABS.

As described above, the method of solving ICI based on the time domain through the ABS is disadvantageous in that real-time traffic cannot be supported because a pico UE placed at the boundary of a pico cell is scheduled only in a subframe set as an ABS. Furthermore, there may be a disadvantage in that, if an ABS is not configured according to the circumstances of a macro cell, scheduling for a pico UE placed at the boundary may not be performed.

Figure 8:
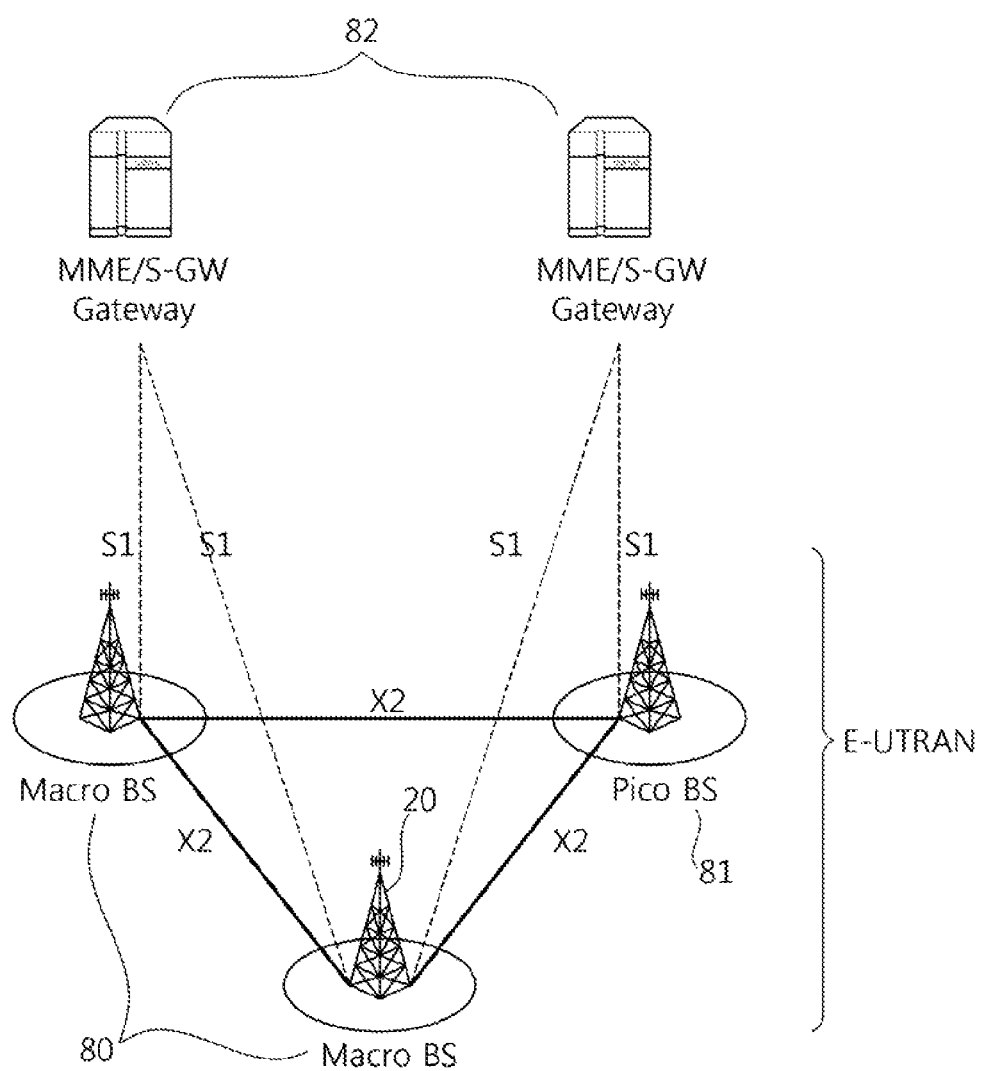
FIG. 8 shows a radio interface structure of layer 2 or higher in 3GPP LTE.

FIG. 8 shows a radio interface structure of layer 2 or higher in 3GPP LTE. Referring to FIG. 8, a plurality of macro BSs 80 and a pico BS 81 are interconnected through an X2 interface, and each of the macro BSs 80 and an MME/S-GW 82 or the pico BS 81 and the MME/S-GW 82 are interconnected through an 51 interface.

Figure 9:
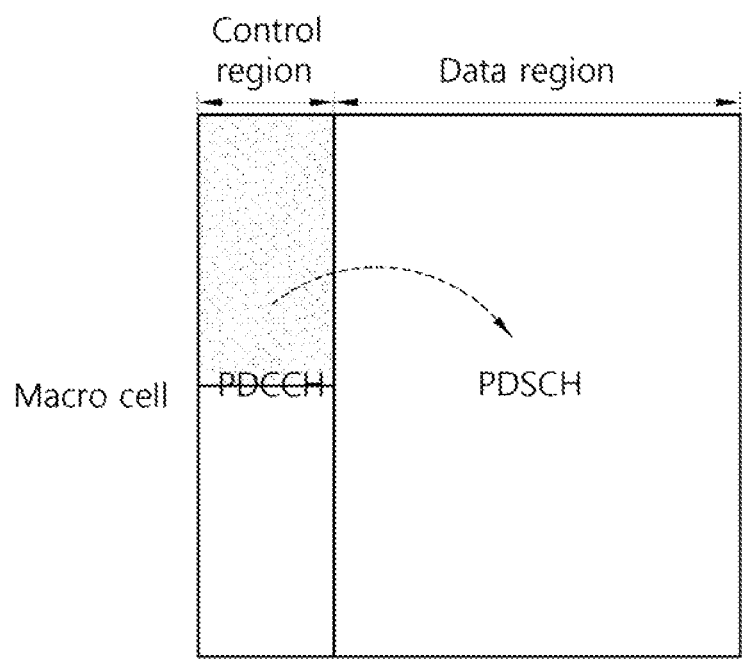
FIG. 9 shows an embodiment of a frequency domain-based solution for reducing ICI in a heterogeneous network communication environment.
Figure 9:
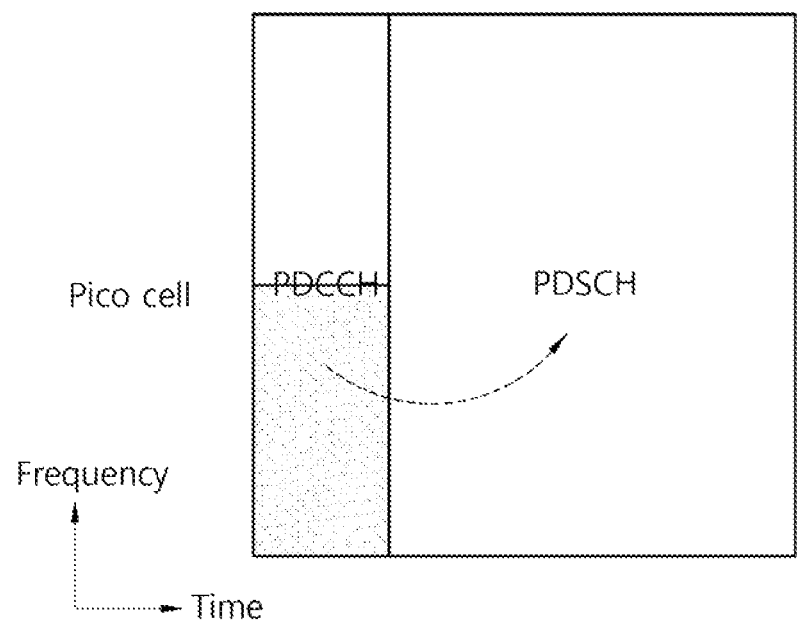

FIG. 9 shows an embodiment of the frequency domain-based solution for reducing ICI in a heterogeneous network communication environment.

Referring to FIG. 9, each of a macro cell and a pico cell determines the size of a necessary control region based on a load factor or a distribution of users within the cell, sets the control region within an independent frequency band, and transmits a PDCCH. That is, the control region of the macro cell and the control region of the pico cell do not overlap with each other. Each of the macro cell and the pico cell broadcasts information about the control region to all users within the cell. A macro UE can read only control information transmitted in the control region of the macro cell, and a pico UE can read only control information transmitted in the control region of the pico cell.

If, as described above, the ICI problem is sought to be solved by separately setting the control region of the macro cell and the control region of the pico cell, ICI only in the control region is solved, but the ICI problem in the data region is not solved. Furthermore, there may be a problem in that an available control region may be insufficient because a limited control region must be shared by the macro cell and the pico cell. Furthermore, there is a disadvantage in that the control region cannot be dynamically operated because information about the setting of the control region of the macro cell and the control region of the pico cell must be transmitted to all users within the cell. In other words, resources are not efficiently used.

As described above, both the time domain-based solution and the frequency domain-based solution for reducing ICI are disadvantageous and inevitably limitedly used in a specific communication environment. For this reason, it is necessary to propose an ICI reduction method which may be universally applied irrespective of a communication environment. Some examples of a method of reducing ICI between a macro cell and a pico cell are hereinafter described, but not limited thereto. Furthermore, the ICI reduction methods proposed below may be combined with the existing time domain-based solution and the existing frequency domain-based solution.

In the next-generation mobile communication system, a lot of research is being carried out in order to widen the cell coverage and increase the transfer rate by using a multiple transmission/reception antenna communication technique. In particular, a multiple antenna technique can form a transmission beam for every layer by linearly processing each layer of MIMO using precoding. A precoding method used in MIMO includes an open-loop method and a closed-loop method. 3GPP LTE and LTE-A support both the open-loop method and the closed-loop method. Precoding may be represented as in Equation 1 below. It is here assumed that cyclic delay diversity (CDD) is not applied to a transmission signal.

$$\begin{bmatrix} y^{(0)}(i) \\ \vdots \\ y^{(P-1)}(i) \end{bmatrix} = W(i) \begin{bmatrix} x^{(0)}(i) \\ \vdots \\ x^{(\upsilon-1)}(i) \end{bmatrix} \quad \langle \text{Equation 1} \rangle$$

W(i): precoding matrix with size P×ν

Table 1 and Table 2 show precoding matrices which are defined in 3GPP LTE and LTE-A according to an antenna port configuration. The precoding matrices are orthogonal to each other. Furthermore, a UE may decode a reception signal by obtaining precoding information applied to the reception signal because a BS transmits a precoding matrix indicator (PMI) through a downlink (DL) grant transmitted through a PDCCH.

TABLE 1

| Codebook index | Number of layers ν | |
|---|---|---|
| | 1 | 2 |
| 0 | $\frac{1}{\sqrt{2}}\begin{bmatrix} 1 \\ 1 \end{bmatrix}$ | $\frac{1}{\sqrt{2}}\begin{bmatrix} 1 & 0 \\ 0 & 1 \end{bmatrix}$ |
| 1 | $\frac{1}{\sqrt{2}}\begin{bmatrix} 1 \\ -1 \end{bmatrix}$ | $\frac{1}{2}\begin{bmatrix} 1 & 1 \\ 1 & -1 \end{bmatrix}$ |
| 2 | $\frac{1}{\sqrt{2}}\begin{bmatrix} 1 \\ j \end{bmatrix}$ | $\frac{1}{2}\begin{bmatrix} 1 & 1 \\ j & -j \end{bmatrix}$ |
| 3 | $\frac{1}{\sqrt{2}}\begin{bmatrix} 1 \\ -j \end{bmatrix}$ | — |

TABLE 2

| Codebook index | $u_n$ | Number of layers ν | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

Table 1 shows the precoding matrices defined for every layer when the number of layers is 2, and table 2 shows the precoding matrices defined for every layer when the number of layers is 4.

Proposed methods of transmitting control information for a reduction of ICI according to some embodiment are described below.

A macro cell and a pico cell may communicate with each other through the X2 interface. The macro cell and the pico cell may exchange PMI setting information each other through the X2 interface. Furthermore, the macro cell may transmit ABS setting information, consisting of a bitmap of 40 bits, to the pico cell.

Meanwhile, the macro cell and the pico cell may receive information about PMI setting information or a channel quality indicator (CQI), obtained by a UE, through feedback. Here, the PMI and/or the CQI may be measured in a unit of subband basis by dividing a frequency band into several subbands. In general, a UE may send the CQI of an optimal subband having the best measurement value, from among CQIs measured in unit of subband, to a macro cell or a pico cell as feedback. Furthermore, the UE may select a PMI having the best average signal to interference noise ratio (SINR) or the best spectral efficiency for the entire frequency band and send the selected PMI to the macro cell or the pico cell as feedback. A BS may schedule the UE based on the feedback PMI and/or the feedback CQI by applying the feedback PMI to the optimal subband of the UE. In some embodiments, the macro cell and the pico cell may directly obtain PMI setting information or information on the CQI. The pico cell may obtain the PMI setting information or the information on the CQI for every subband by directly measuring a signal received from the macro cell. Furthermore, the macro cell or the pico cell may periodically obtain the PMI setting information by analyzing PMI use information. Here, the BS may analyze PMI use information which is chiefly used according to the position of the UE.

Figure 10:
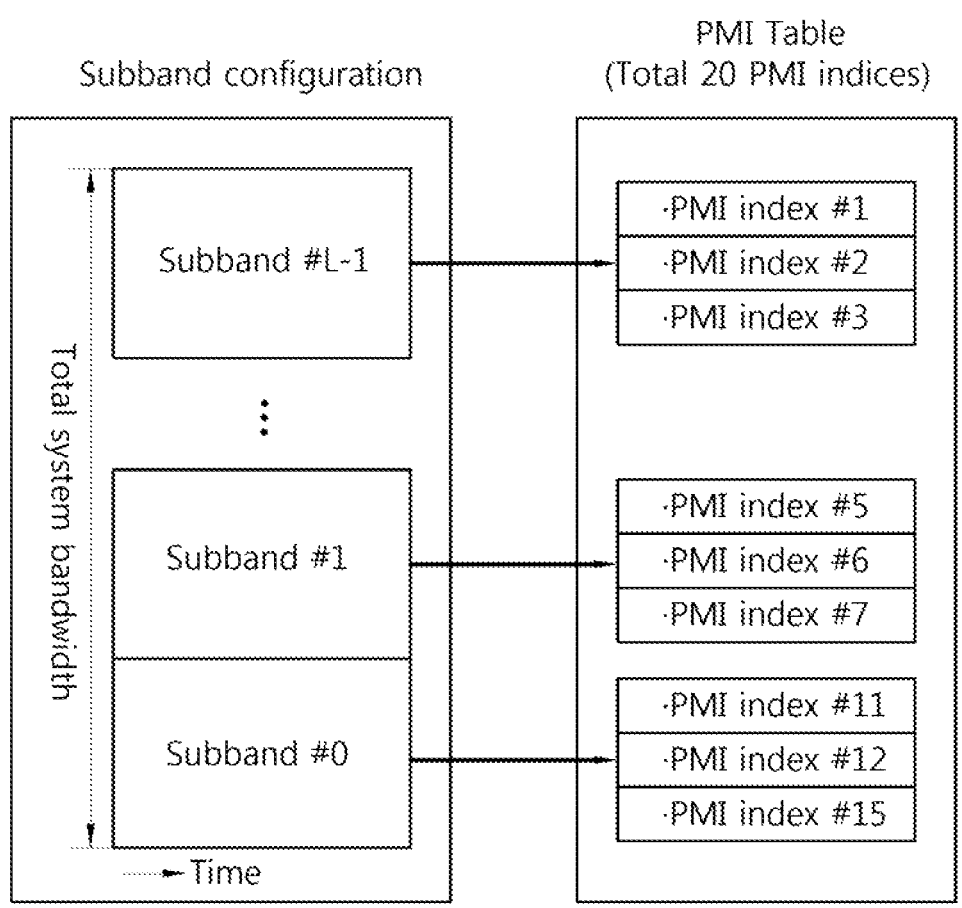
FIG. 10 shows an example of PMI indices for the subbands of a macro cell which form a beam in the direction of a pico cell.

FIG. 10 shows an example of PMI indices for the subbands of a macro cell which form a beam in the direction of a pico cell.

If the channels of the macro cell and the pico cell are uncorrelated (i.e., the channel between the macro cell and the pico cell are rich scattered or independently and identically distributed (IID)), there is a high probability that PMIs selected for each subband in the macro cell are different from each other. Furthermore, the macro cell may uniformly use all the PMIs. Accordingly, PMIs forming a beam for each subband in the same direction as the pico cell direction may differ from each other. Referring to FIG. 10, if the entire system bandwidth consists of L subbands, each subband may use different PMIs. The PMI table of FIG. 10 may be obtained by accumulating information about PMIs, used by each UE for each subband, from the UEs in a cell.

Meanwhile, if the channel between the macro cell and the pico cell are partially or fully correlated, PMIs selected for each subband in the macro cell may be identical with each other. Furthermore, the number of subbands using the same PMI according to a channel correlation may be increased. In particular, when the channel correlation has a maximum value of 1, all the subbands forming the entire system bandwidth may use the same PMI. A macro cell may use only some of PMIs, and thus PMIs forming a beam in the pico cell for each subband may be identical with each other.

In order to reduce ICI, a first cell may transmit PMI use information for each time frequency resource to a second cell. The PMI use information may indicate PMI information which is limited used in the time frequency resources, such as some subframes or some subbands.

For example, a macro cell may set a subframe, not using the non-preferred PMIs of a specific pico cell, periodically or aperiodically for a pico UE served by the specific pico cell. A macro cell may transmit information about non-preferred PMIs or information about a subframe not using non-preferred PMIs to a relevant pico cell. In some embodiments, a macro cell may configure a PMI subset according to the configuration of pico cells within the coverage of the macro cell. For example, when a codebook of 3 bits is used, a PMI subset may be configured as in a PMI subset #0={PMI #0, #1, #5, #6}, a PMI subset #1={PMI #2, #3, #4, #7}. The PMI subsets #0 and #1 may be alternately used for every subframe within a specific frame. A specific frame that alternately transmits the PMI subset may be called a PMI subset rotating frame. Here, a macro cell may transmit configuration information about the PMI subset, configuration information about the PMI subset rotating frame, and PMI subset information rotated within the PMI subset rotating frame to a pico cell.

FIG. 11 shows an embodiment of PMI use information according to a proposed method of transmitting control information for a reduction of ICI.

Transmitted PMI use information may be information about PMIs used by a first cell that transmits the PMI use information. That is, the first cell may transmit information about PMIs to be used for every DL subframe to a second cell. Referring to FIG. 11, if the total number of PMIs is 16, the first cell uses all the PMIs PMI #1~PMI#16 in subframes #0, #2, #3, #4, #5, #7, #8, and #9. On the other hand, the first cell uses only the PMIs #1~PMI #5 in subframes #1 and #6. Accordingly, the second cell may allocate DL resources to the subframe #1 and/or the subframe #6 for a UE which is not greatly influenced by interference because the UE uses the PMI #1~PMI #5 of the first cell. The UE to which DL resources have been allocated in the subframe #1 and/or the subframe #6 may measure a CQI in either the subframe #1 or the subframe #6 because the interference level differs in each subframe. In some embodiments, the transmitted PMI use information may be information about PMIs not to be used by the first cell that transmits the PMI use information.

The transmitted PMI use information may be information about PMIs available for the second cell that receives the PMI use information. FIG. 11 may be applied to this case. If the total number of PMIs is 16, the second cell may use the PMI #1~PMI #5 in the subframes #1 and #6 and may use all the PMIs in the remaining subframes. The second cell that has received the PMI use information may allocate DL resources to a UE using the PMI #1~the PMI #5 in the subframe #1 and/or the subframe #6. The UE to which the DL resources have been allocated in the subframe #1 or the subframe #6 or both may measure a CQI in only either the subframe #1 or the subframe #6 because the interference level differs in each subframe. In some embodiments, the transmitted PMI use information may be information about PMIs desired not to be used by the second cell that receive the PMI use information.

The PMI use information transmitted from the first cell to the second cell may be configured in various forms.

1) The PMI use information may be configured by directly listing used or not used PMIs. Here, the PMI use information may be configured using bitmaps corresponding to the number of PMIs or the PMI use information may be configured by listing all relevant PMIs, such as a PMI #1, a PMI #3, and a PMI #9.

2) The PMI use information may be configured according to several PMIs and the number of PMIs. In this case, the amount of information transmitted can be reduced as compared with the case where PMIs are directly listed. Each of the several PMIs and PMIs corresponding to the number of PMIs, from among PMIs having the greatest correlation value or the smallest correlation value with respect to a corresponding PMI, may be transmitted by the PMI use information. For example, if PMIs #1 and #3 and the number {2,1} of PMIs are transmitted by the PMI use information, a second cell that receives the PMI use information may recognize both PMIs #9 and #10 (i.e., 2 PMIs having the smallest correlation value with the PMI #1) and a PMI #15 (i.e., 1 PMI having the smallest correlation value with the PMI #3) along with the PMIs #1 and #3. Furthermore, if only the number {2} of PMIs is included in the PMI use information, the second cell may recognize each of two PMIs having the smallest correlation value with the PMIs #1 and #3.

3) The PMI use information may be configured using several PMIs and a threshold.

For example, the PMI use information may be configured using PMIs #1 and #3 and a threshold {0.2, 0.1}. Here, a second cell may recognize PMIs #5 and #7 each having a correlation value of 0.2 or less with the PMI #1 and also know a PMI #15 having a correlation value or 0.1 or less with the PMI #3. Furthermore, the threshold may be in common set for a plurality of PMIs.

Meanwhile, if the PMIs of a first cell consist of two or more PMIs, the first cell may inform a second cell of PMI use information about all the PMIs or inform the second cell of PMI use information about some of the two or more PMIs. For example, in case of a precoding matrix $W=W_1W_2$, a first cell may transmit PMI use information about W to a second cell or may transmit only PMI use information about $W_1$ to the second cell. Here, a UE served by the second cell may send information about $W_1$ to the second cell as feedback.

In some embodiments, in order to reduce ICI, a first cell may transmit antenna use information about each time frequency resource to a second cell. In the following description, the antenna may be replaced with not only a physical antenna, but also an antenna port, an antenna node, an antenna group, an antenna node group, a pilot, a reference signal, a channel state information (CSI) reference signal, a CRS, a midamble, and so on.

FIG. 12 shows an embodiment of antenna use information according to a proposed method of transmitting control information for a reduction of ICI.

Transmitted antenna use information may be information about antennas used by a first cell that transmits the antenna use information. That is, the first cell may transmit information about antennas to be used for every DL subframe to a second cell. Referring to FIG. 12, if the total number of antennas is 16, a first cell uses all the antennas (antennas #1~#4) in subframes #0, #2, #3, #4, #5, #7, #8, #9, but uses only the antennas #2~#4 in subframes #1 and #6. A second cell may use received antenna use information for the scheduling of a UE. For example, the second cell may allocate DL resources in the subframe #1 and/or the subframe #6 for a UE that is not greatly subjected to interference from the antennas #2~#4 of a macro cell. The UE to which the DL resources have been allocated in the subframe #1 and/or the subframe #6 may measure a CQI only either the subframe #1 or the subframe #6 because an interference level differs in each subframe. Meanwhile, before the information about the antennas used by the first cell is transmitted, the UE served by the second cell may send information about the antennas of the first cell, having great or small interference, to the second cell as feedback. The second cell may transmit interference antenna information, received from the UE, or interference antenna information, directly measured by the second cell, to the first cell.

Furthermore, the transmitted antenna use information may be information about antennas available for a second cell that receives the antenna use information. FIG. 12 may be applied to even this case. A second cell that has received the antenna use information may allocate DL resources to a UE that uses the antennas #2~#4 in the subframe #1 and/or the subframe #6. The UE to which the DL resources have been allocated in the subframe #1 and/or the subframe #6 may measure a CQI only either the subframe #1 or the subframe #6 because an interference level differs in each subframe. Meanwhile, before the information about antennas available for the second cell is transmitted, the first cell may directly receive interference antenna information from a UE served by the first cell as feedback or directly measure interference antenna information.

The antenna use information may be configured in such a way as to directly list antennas used or not used. For example, assuming that the number of antennas of a first cell is 4 and an antenna use pattern is repeated in cycle of ten subframes, antenna use information transmitted from the first cell to a second cell may be 40 bits. In case of FIG. 12, the antenna use information may be [1111 0111 1111 1111 1111 1111 0111 1111 1111 1111]. That is, the antenna use information of 40 bits may indicate that the antenna #1 of the subframes #1 and #6 is used or not used. In some embodiments, in order to reduce the size of the antenna use information, a bitmap indicating a subframe where some antennas are not used and a bitmap indicating antennas used or not used within the subframe may be separately transmitted. In case of FIG. 12, the bitmap indicating the subframe where some antennas are not used may be [0100001000], and the bitmap indicating the antennas used or not used within the subframe may be [01110111].

The ICI reduction method based on the PMI use information or the ICI reduction method based on the antenna use information may have different effects according to the configuration of the antennas of a second cell that receives use information. For example, if a correlation value between the antennas of the second cell is high, the ICI reduction method based on the PMI use information may efficiently reduce ICI while less degrading the performance of the second cell. On the other hand, if a correlation value between the antennas of the second cell is small or antennas are dispersed within the cell, the ICI reduction method based on the antenna use information is more efficient. Accordingly, in order to more efficiently reduce ICI, it is preferred that a UE served by a first cell select one of the two types of the ICI reduction methods and inform the first cell of the selected ICI reduction method. In this case, the UE must have previously known information about the pilot (i.e., a reference signal, a CRS, a CSI-RS, a midamble, or an antennas port) of the second cell. In some embodiments, the first cell may instruct the UE to feed one of the two types of the ICI reduction methods back to the first cell. To this end, the second cell may select one of the two types of the ICI reduction methods and informs the first cell of the selected ICI reduction method.

Figure 13:
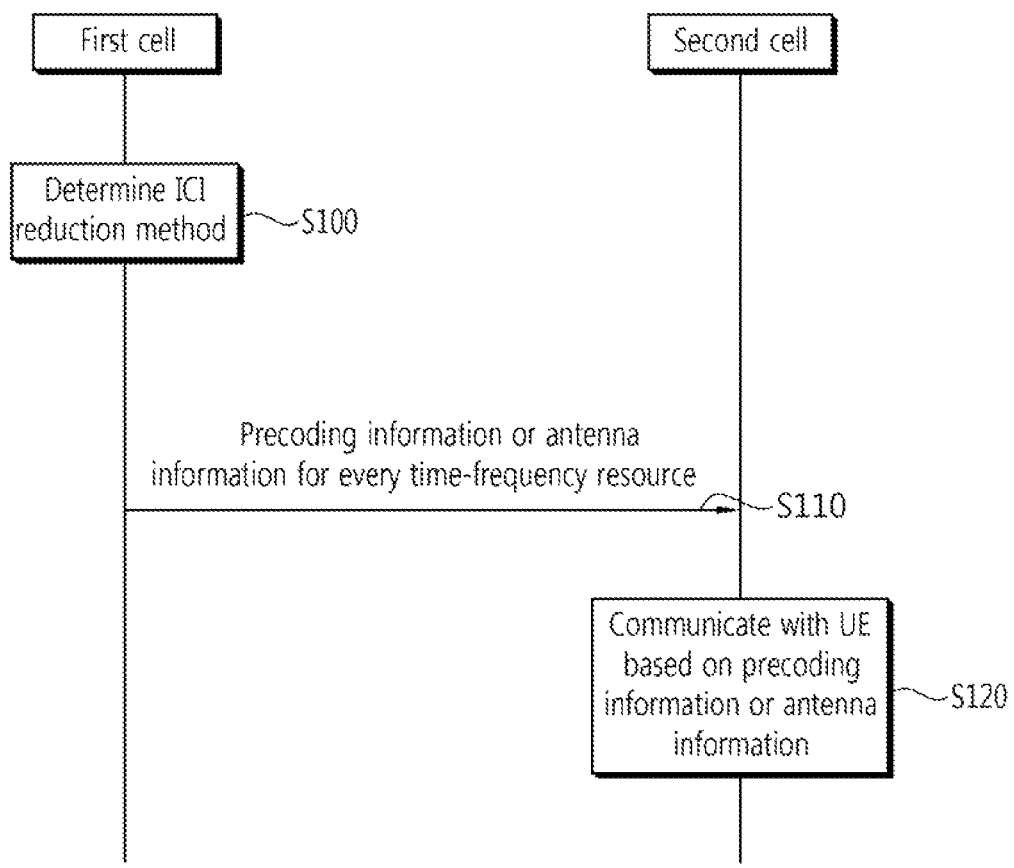
FIG. 13 shows an embodiment of a proposed method of transmitting control information for a reduction of ICI.

FIG. 13 shows an embodiment of a proposed method of transmitting control information for a reduction of ICI.

At step S100, a first cell determines an ICI reduction method. Here, the ICI reduction method may be the method based on the PMI use information or the method based on the antenna use information. At step S110, the first cell may transmit precoding information or antenna information for each frequency resource to a second cell based on the determined ICI reduction method. At step S120, the second cell allocates resources based on the received precoding information or the received antenna information and communicates with a UE.

Figure 14:
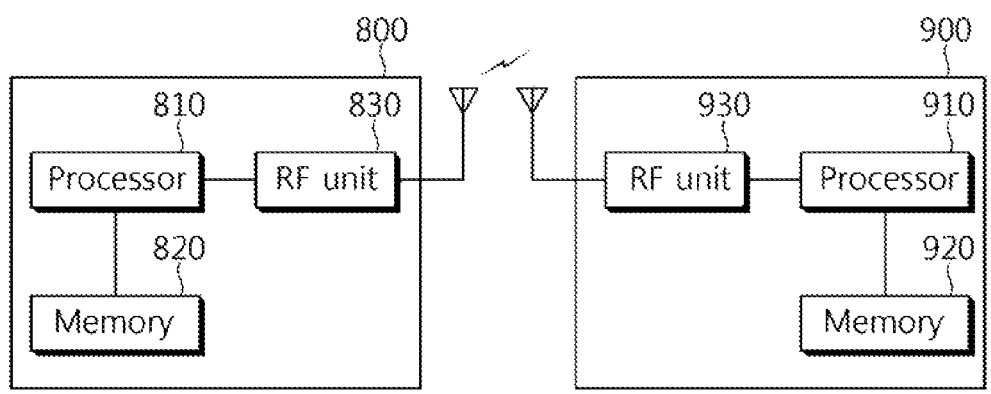
FIG. 14 is a block diagram of a wireless communication system according to an embodiment of the present invention.

FIG. 14 is a block diagram of a wireless communication system according to an embodiment of the present invention.

A first base station 800 includes a processor 810, a memory 820, and a radio frequency (RF) unit 830. The processor 810 implements the proposed functions, procedures, and/or methods. Layers of a radio interface protocol can be implemented by the processor 810. The memory 820 coupled to the processor 810 stores a variety of information for driving the processor 810. The RF unit 830 coupled to the processor 810 transmits and/or receives a radio signal.

A second base station 900 includes a processor 910, a memory 920, and an RF unit 930. The processor 910 implements the proposed functions, procedures, and/or methods. Layers of a radio interface protocol can be implemented by the processor 910. The memory 920 coupled to the processor 910 stores a variety of information for driving the processor 910. The RF unit 930 coupled to the processor 810 transmits and/or receives a radio signal.

The processor 910 may include an application-specific integrated circuit (ASIC), another chip set, a logical circuit, and/or a data processing unit. The RF unit 920 may include a baseband circuit for processing radio signals. In software implemented, the aforementioned methods can be implemented with a module (i.e., process, function, etc.) for performing the aforementioned functions. The module may be performed by the processor 910.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

The invention claimed is:

1. A method for transmitting, by a first base station, control information for inter-cell interference (ICI) reduction in a wireless communication system, the method comprising:
checking a correlation value between antennas of a second base station;
selecting precoding information indicating that the first base station uses precoding matrix indicators (PMIs) for a first subframe and a part of the PMIs for a second subframe, or antenna information indicating that the first base station uses antennas of the first base station for the first subframe and a part of the antennas of the first base station for the second subframe; and
transmitting the precoding information or the antenna information to the second base station,
wherein if the correlation value between the antennas of the second base station is higher than a predetermined value, the precoding information is selected by the first base station and is transmitted to the second base station, and
wherein if the correlation value between the antennas of the second base station is lower than or equal to the predetermined value, the antenna information is selected by the first base station and is transmitted to the second base station.

2. The method of claim 1, wherein the precoding information further indicates PMIs usable by the second base station for the first subframe a part of the PMIs usable by the second base station for the second subframe.

3. The method of claim 1, wherein the precoding information includes a bitmap based on a number of the PMIs.

4. The method of claim 1, wherein the precoding information includes an index of at least one PMI and a number of PMIs based on the at least one PMI.

5. The method of claim 1, wherein the precoding information includes an index of at least one PMI and a threshold based on the at least one PMI.

6. The method of claim 1, wherein the antenna information further indicates antennas usable by the second base station for the first subframe and a part of the antennas usable by the second base station for the second subframe.

7. The method of claim 6, further comprising:
receiving, from the second base station, receiving antenna interference information measured by user equipments served by the second base station, wherein the antenna information is based on the received antenna interference information.

8. The method of claim 6, further comprising:
receiving antenna interference information measured by user equipments served by the first base station, or directly obtaining antenna interference information,
wherein the antenna information is based on the received or obtained antenna interference information.

9. The method of claim 6, wherein the antenna information includes a bitmap based on a number of the antennas of the first base station.

10. The method of claim 1, wherein the second base station allocates downlink resources to a user equipment based on the received precoding information or the received antenna information.

11. The method of claim 1, wherein the precoding information and the antenna information are determined by a user equipment serviced by the first base station.

12. The method of claim 1, wherein the first base station is a base station providing service to a macro cell,
wherein the second base station is a base station providing service to a femto cell or a pico cell having service coverage included in service coverage of the macro cell.

13. A first base station for transmitting control information for inter-cell interference (ICI) reduction in a wireless communication system, the first base station comprising:
a radio frequency (RF) unit configured for transmitting or receiving a radio signal; and
a processor, coupled to the RF unit, wherein the processor is configured to:
check a correlation value between antennas of a second base station,
select precoding information indicating that the first base station uses precoding matrix indicators (PMIs) for a first subframe and a part of the PMIs for a second subframe, or antenna information indicating that the first base station uses antennas of the first base station for the first subframe and a part of the antennas of the first base station for the second subframe, transmit the precoding information or the antenna information to the second base station, wherein if the correlation value between the antennas of the second base station is higher than a predetermined value, the precoding information is selected by the first base station and is transmitted to the second base station, and wherein if the correlation value between the antennas of the second base station is lower than or equal to the predetermined value, the antenna information is selected by the first base station and is transmitted to the second base station.

14. The first base station of claim 13, wherein the precoding information further indicates PMIs usable by the second base station for the first subframe and a part of the PMIs usable by the second base station for the second subframe.

15. The first base station of claim 13, wherein the antenna information further indicates antennas usable by the second base station for the first subframe and a part of the antennas usable by the second base station for the second subframe.

\* \* \* \* \*